United States Patent

Hirabayashi et al.

Patent Number: 5,546,306
Date of Patent: Aug. 13, 1996

[54] MULTIPLE PROCESSOR THROTTLE CONTROL APPARATUS FOR AN INTERNAL COMBUSTION ENGINE

[75] Inventors: Kazuo Hirabayashi; Norio Suzuki; Yosuke Tachibana, all of Wako, Japan

[73] Assignee: Honda Giken Kogyo Kabushiki Kaisha, Tokyo, Japan

[21] Appl. No.: 134,700

[22] Filed: Oct. 12, 1993

[30] Foreign Application Priority Data

Oct. 27, 1992 [JP] Japan .................................. 4-289023
Oct. 27, 1992 [JP] Japan .................................. 4-289037

[51] Int. Cl.$^6$ .............................. F02D 9/02; B60K 31/02
[52] U.S. Cl. .............................. 364/424.04; 364/426.04; 364/431.03; 123/198 D; 123/361; 123/479
[58] Field of Search ...................... 364/424.04, 431.03, 364/431.07, 426.04; 123/360, 361, 399, 436, 198 D, 478, 479

[56] References Cited

U.S. PATENT DOCUMENTS

| | | | |
|---|---|---|---|
| 4,779,597 | 10/1988 | Takaku et al. | 123/479 |
| 4,854,283 | 8/1989 | Kiyono et al. | 123/361 |
| 4,895,118 | 1/1990 | Nakamura | 123/339 |
| 4,942,859 | 7/1990 | Morikawa | 123/198 D |
| 4,995,364 | 2/1991 | Kamei et al. | 123/442 |
| 5,002,028 | 3/1991 | Arai et al. | 123/339 |
| 5,024,284 | 6/1991 | Nakano et al. | 180/179 |
| 5,048,484 | 9/1991 | Terazawa et al. | 123/361 |
| 5,056,026 | 10/1991 | Mitchell et al. | 364/431.03 |
| 5,084,821 | 1/1992 | Ohsuga et al. | 364/424.05 |
| 5,109,342 | 4/1992 | Nakano et al. | 364/426.04 |
| 5,163,402 | 11/1992 | Taguchi et al. | 123/396 |
| 5,235,951 | 8/1993 | Taguchi et al. | 123/397 |
| 5,251,138 | 10/1993 | Katayama | 364/426.02 |

*Primary Examiner*—Kevin J. Teska
*Assistant Examiner*—Tan Nguyen
*Attorney, Agent, or Firm*—Nikaido, Marmelstein, Murray & Oram LLP

[57] ABSTRACT

An electronic control apparatus for an engine of a vehicle has a first CPU for fuel control which controls the amount of fuel to be supplied to the engine and a second CPU for throttle valve control which outputs a driving signal to an actuator which operates to open or close the throttle valve disposed in an intake pipe to the engine. The apparatus has an opening degree computing member which is provided in the first CPU to compute an opening degree of the throttle valve based at least on an amount of depression of an accelerator and then to output a result thereof as an opening degree signal. The first CPU and the second CPU are connected together by a communication line which transfers the opening degree signal from the opening degree computing member from the first CPU to the second CPU.

6 Claims, 5 Drawing Sheets

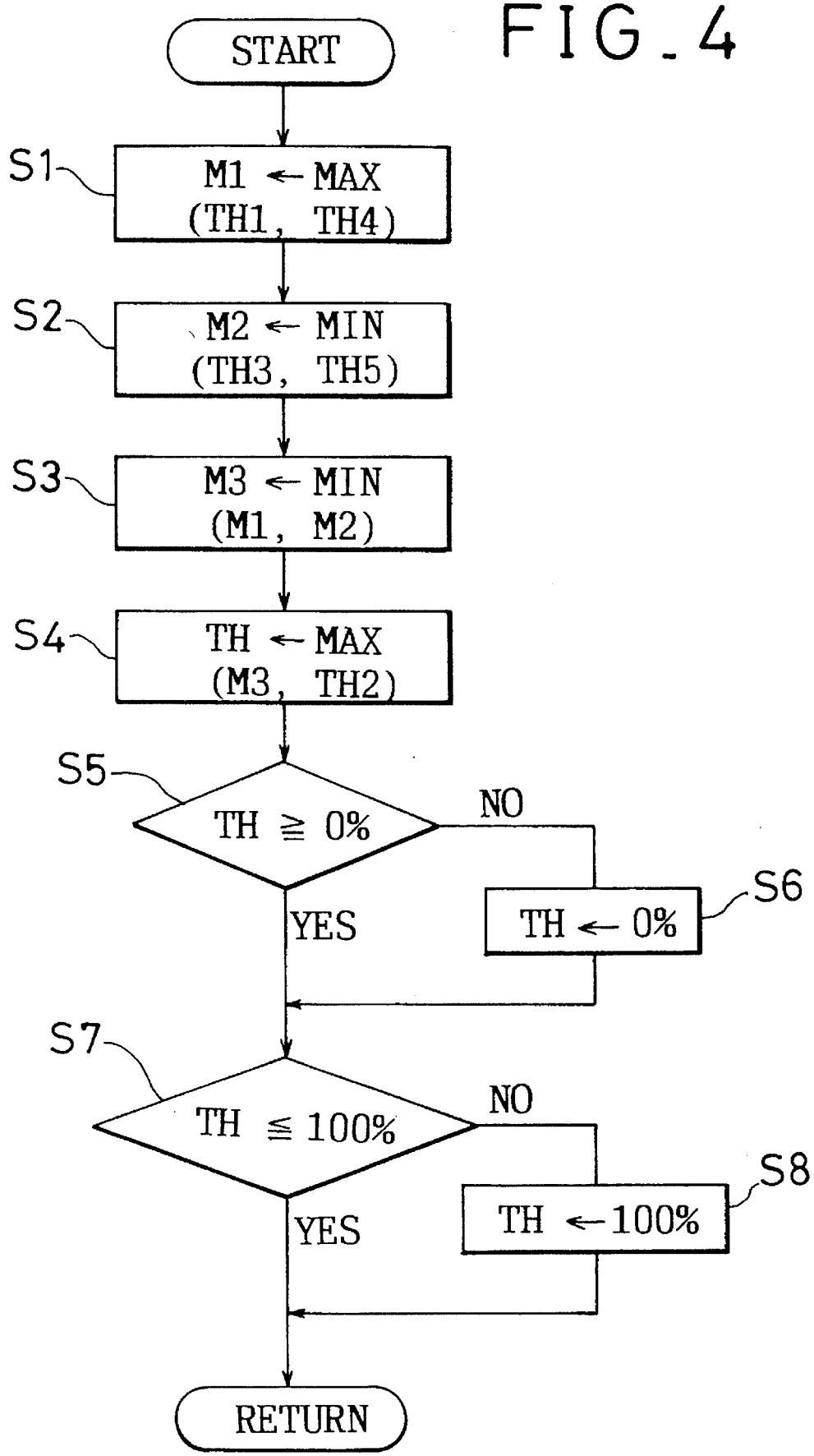
FIG_4

MULTIPLE PROCESSOR THROTTLE CONTROL APPARATUS FOR AN INTERNAL COMBUSTION ENGINE

BACKGROUND OF THE INVENTION

1. Field of the Invention

The present invention relates to such an electronic control apparatus for an engine of a vehicle as is provided with a central processing unit (CPU) for controlling a throttle valve which is disposed in an intake pipe of the engine, by outputting an opening degree signal to an actuator which operates to open or close the throttle valve.

2. Description of Related Art

In a conventional electronic control apparatus for an engine of a vehicle, a CPU for throttle valve control is provided with a large number of input ports for inputting detected signals from an acceleration sensor which detects the amount of depression of an accelerator and various other sensors which detect the engine conditions, as well as with a high-accuracy or high-resolution analog/digital (A/D) converting portion or converter which converts each of the detected signals. It is so arranged, inside this CPU for throttle valve control, that an opening degree signal which is to be output to the actuator is computed based on the detected signals which have been converted in the A/D converter.

In case where the engine is of an electronic fuel injection type, the electronic control apparatus is provided with a CPU for fuel control which controls the amount of fuel to be supplied to the engine. This CPU for controlling the fuel inputs detected signals from an acceleration sensor which detects the amount of depression of an accelerator as well as from various other sensors which detect the engine conditions. Based on these detected signals the amount of fuel to be supplied is computed. For that purpose, this CPU is provided with an input member which has many input ports and a high-accuracy A/D converter which converts the detected signals to digital signals. In order to process these converted signals at a high speed, the CPU itself has a high capacity.

In the above-described conventional arrangement, not only the CPU for fuel control but also the CPU for throttle valve control has to be provided with the input member which has many input ports and the high-resolution A/D converter. Further, the CPU for throttle valve control must also be of a high-capacity or high-performance one. As a result, the cost of the electronic control apparatus becomes expensive.

In view of the above-described disadvantages, the present invention has an object of providing at a smaller cost such an electronic control apparatus for an engine of a vehicle as is provided with a capacity equivalent to that of a conventional one.

According to one aspect of the present invention, the foregoing and other objects are attained by an electronic control apparatus for an engine of a vehicle, the apparatus having a first CPU for fuel control which controls the amount of fuel to be supplied to the engine and a second CPU for throttle valve control which outputs a driving signal to an actuator which operates to open or close a throttle valve disposed in an intake pipe to the engine, the apparatus comprising: an opening degree computing member which is provided in the first CPU to compute an opening degree of the throttle valve based at least on an amount of depression of an accelerator and then to output a result thereof as an opening degree signal; the first CPU and the second CPU being connected together by a communication line which transfers the opening degree signal from the opening degree computing member from the first CPU to the second CPU.

Among the opening degree signals to determine the driving signal to the actuator, those which are based on the amount of depression of the accelerator, or the like are computed by using the same data as for the computation, in the first CPU, of the amount of fuel supply. By letting this computation for obtaining the opening degree signal be carried out in the first CPU and then transferring the opening degree signal, which is the result of the computation, to the second CPU, the input ports for the second CPU may be small in number. Further, the second CPU needs neither be provided with a high-resolution A/D converter nor be required to have a high performance or capacity. It becomes thus possible to use, as the second CPU, a CPU which is cheaper than a conventionally used one.

In a preferred embodiment, there is sometimes provided a constant speed computing and controlling member which computes that opening degree of the throttle valve which causes the vehicle to travel at a constant speed to be set by a vehicle speed setting signal. Since it is sufficient for this constant speed computing and controlling member to compute the opening degree of the throttle valve based on a vehicle speed signal which has already been pulse-inputted in the first CPU, it does not require a high-resolution or high-capacity A/D converter for inputting the opening degree of the throttle valve. Therefore, it is preferable to incorporate this constant speed computing and controlling member into the second CPU in order to determine the above-described driving signal based on a computing result of the constant speed computing and controlling member and on the opening degree signal from the first CPU.

Further, in order to detect any abnormality which may occur in the first CPU, it is preferable to employ the following arrangement. Namely, the signal representing the amount of depression of the accelerator is also input to the second CPU. Based on this signal of amount of depression of the accelerator, a rough opening degree signal is obtained. Based on this rough opening degree signal, a judgement is made in the second CPU as to whether the opening degree signal being transferred from the first CPU is abnormal or not.

If, like in the conventional art, the opening degree of the throttle valve based on the amount of depression of the accelerator is computed only by the CPU for throttle valve control, there is the following disadvantage. Namely, when there has occurred an abnormality such as a trouble or the like in a throttle valve control system inclusive of the CPU for throttle valve control, it becomes impossible to control the opening degree of the throttle valve in interlocking with the operation by the driver of the accelerator.

In preparation for such an abnormality the following solution may be considered. Namely, aside from the throttle valve control system inclusive of the CPU for throttle valve control, there is provided a means for fixing the opening degree of the throttle valve to a predetermined fixed value which is set in advance so that the vehicle may be kept travelling. However, if the opening degree of the throttle valve is fixed in the manner as described above, the vehicle speed does not vary even if the accelerator were depressed, with the result that the driver's intention cannot be reflected on the vehicle's travelling.

In order to increase the redundancy in respect to an abnormality in the throttle valve control system, according to another aspect of the present invention, there is provided an electronic control apparatus for an engine of a vehicle, the apparatus having a CPU for throttle valve control for outputting an opening degree signal to an actuator which operates to open or close a throttle valve disposed in an intake pipe to the engine, the apparatus comprising: a CPU for opening degree computation which computes an opening degree of the throttle valve based at least on an amount of depression of an accelerator and then outputs a result thereof to the CPU for throttle valve control as an opening degree signal; the CPU for throttle valve control comprising: computing means for alternative opening degree computation which computes an alternative signal to the opening degree signal based on the amount of depression of the accelerator; a memory member which memorizes the opening degree signal from the CPU for opening degree computation; and alternative driving means which outputs the alternative signal to the actuator as an opening degree signal when the memory member is abnormal.

In still another aspect of the present invention, there is provided an electronic control apparatus for an engine of a vehicle, the apparatus having a CPU for throttle valve control by outputting an opening degree signal to an actuator which operates to open or close the throttle valve disposed in an intake pipe to the engine, the apparatus comprising: a CPU for opening degree computation which computes an opening degree of the throttle valve based at least on an amount of depression of an accelerator and then outputs a result thereof to the CPU for throttle valve control as an opening degree signal; the CPU for throttle valve control comprising: computing means for alternative opening degree computation which computes an alternative signal to the opening degree signal based on the amount of depression of the accelerator; a memory member which memorizes the opening degree signal from the CPU for opening degree computation; and auxiliary driving means which judges, based on the alternative signal, an abnormality of the opening degree signal which is stored in the memory member and outputs to the actuator an alternative opening degree signal when the opening degree signal is abnormal.

As described above, by providing the CPU for opening degree computation (it is not necessarily limited to the CPU for fuel control as described above) aside from the CPU for throttle valve control, it becomes possible, when an abnormality has occurred in the memory member which is contained inside the CPU for opening degree computation or the CPU for throttle valve control, to output to the actuator the alternative signal to be computed inside the CPU for throttle valve control. As a result, it becomes possible to operate and control the opening degree of the throttle valve depending on the operation of the accelerator.

In case an abnormality has occurred in the CPU for throttle valve control or the actuator and, as a result, the throttle valve can no longer be operated, the speed of rotation of the engine can be limited to a certain degree by limiting the amount of fuel supply. However, the driver's intention cannot be reflected by simply limiting the speed of rotation of the engine, and there is a possibility of the engine to race. It is therefore preferable to prevent the engine from racing by changing, by means of a separately provided CPU for auxiliary control, the upper limit restriction value of a speed of engine rotation and, at the same time, to change this upper limit restriction value based on an amount of depression of the accelerator so that the vehicle speed can be varied in interlocking with the driver's operation of the accelerator.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 4 is a flow diagram showing the processing in which a driving signal is selected;

DETAILED DESCRIPTION OF A PREFERRED EMBODIMENT

Figure 1:
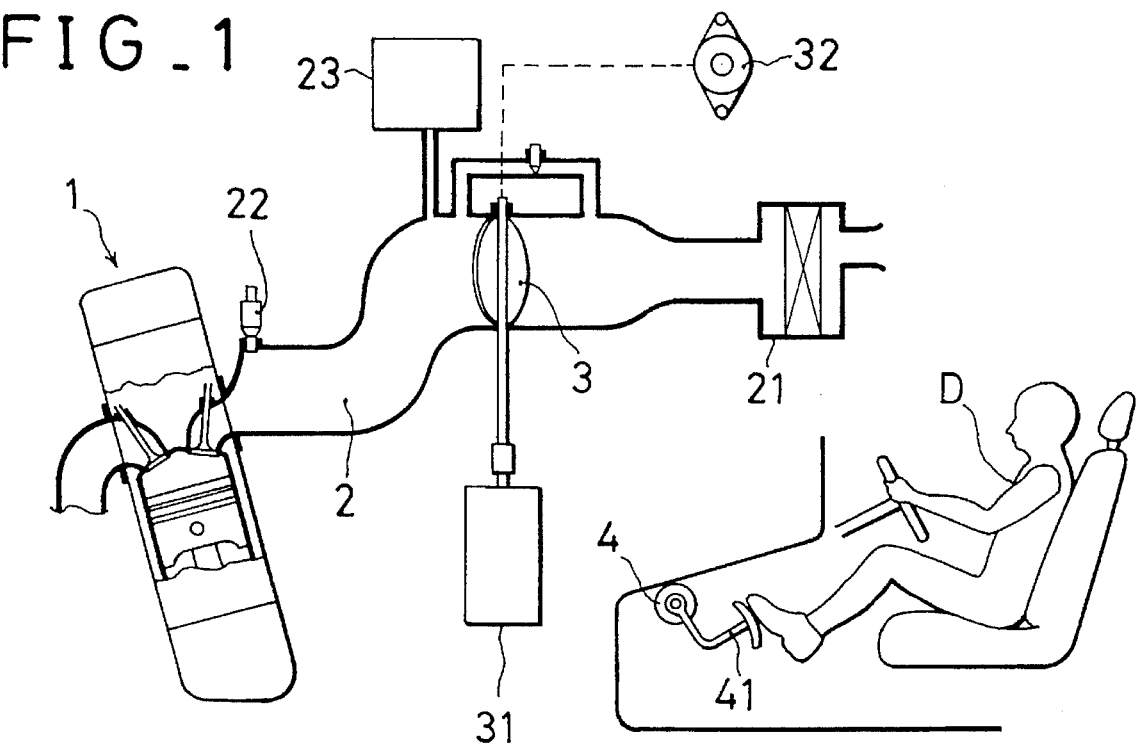
FIG. 1 is a schematic layout around an engine to which the present invention is applied.
Figure 2:
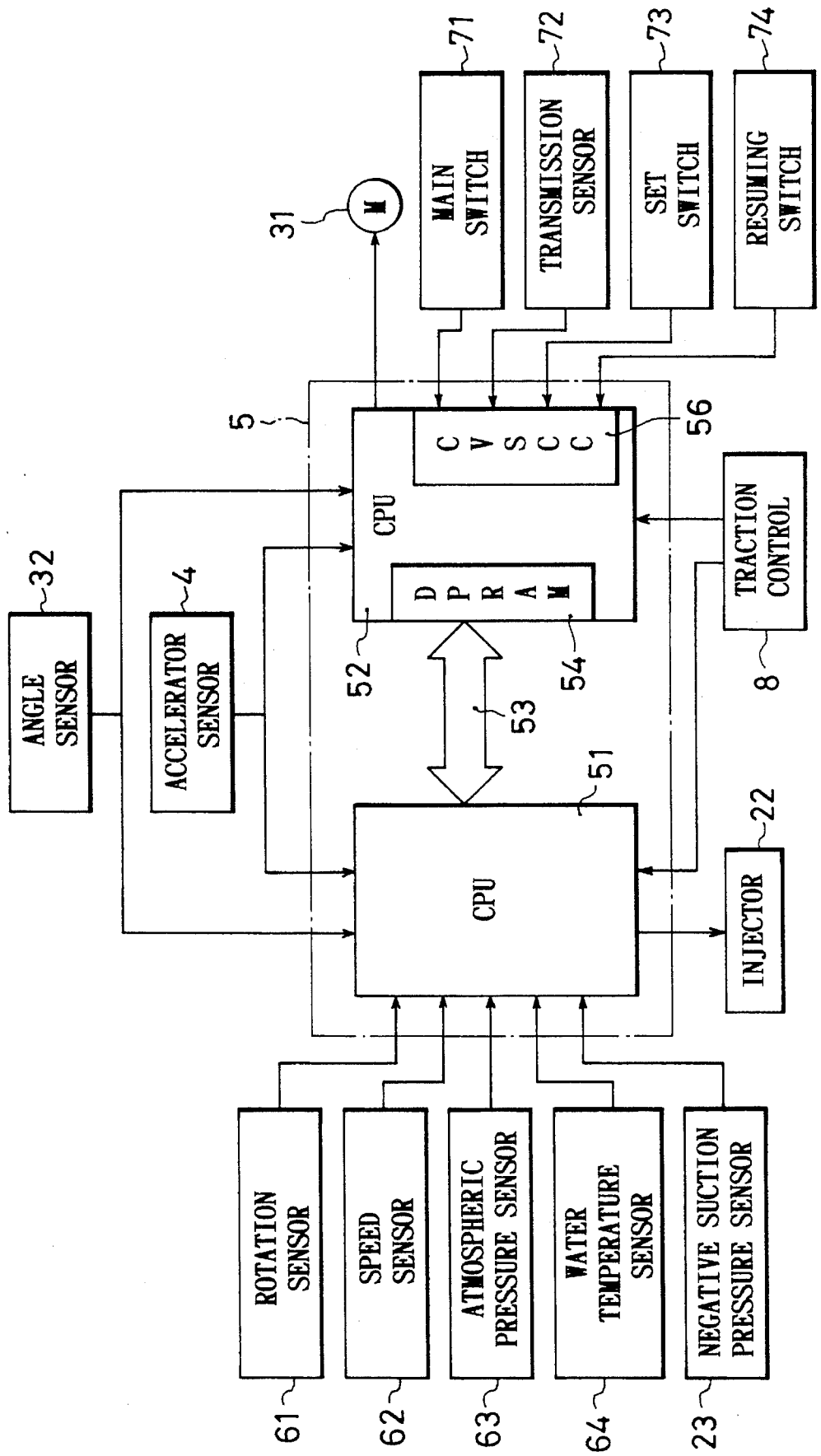
FIG. 2 is a block diagram showing the arrangement of an electronic control apparatus of the present invention.

Referring to FIGS. 1 and 2, numeral 1 denotes that engine of a vehicle which is to be controlled by an electronic control apparatus 5 of the present invention. Air sucked from an air cleaner 21 through an intake pipe 2 is injected with an adequate amount of fuel from an injector 22 and is then charged into a cylinder of the engine 1. On the way to the cylinder of this intake pipe 2 there is provided a throttle valve 3 which increases or decreases the area of air passage. The opening degree of the throttle valve 3 is controlled by an actuator, in the form of a pulse motor 31, which is connected to the throttle valve 3. The actual opening degree thereof is detected by an angle sensor 32 which is attached to the throttle valve 3. Numeral 23 denotes a negative suction pressure sensor which detects the pressure inside the intake pipe 2. On an accelerator 41 to be operated or depressed by a driver D there is mounted an accelerator sensor (AP sensor) which outputs that signal AP of depression amount which is proportional to the amount of depression of the accelerator 41.

The driving control of the pulse motor 31 and the control of the amount of fuel injection from the injector 22 are carried out by the electronic control apparatus 5. In the electronic control apparatus 5 there are contained a first CPU 51 for fuel control which controls the amount of fuel to be supplied to the engine 1 and a second CPU 52 for throttle valve control which controls to open or close the throttle valve 3. Inside the second CPU 52 there is contained a dual port random access memory (DPRAM) 54 which can be accessed or handle data in both directions. The first CPU 51 and the DPRAM 54 are connected together by a bus line 53 which serves as a communication line.

Both the first CPU 51 and the second CPU 52 are input with the signal of depression amount from the accelerator sensor 4 and the signal of actual opening degree of the throttle valve 3 from the angle sensor 32. To the first CPU 51 there are connected the negative suction pressure sensor 23, a rotation sensor 61 for detecting the speed of rotation of the engine 1, a vehicle speed sensor 62 for detecting the speed of the vehicle, an atmospheric pressure sensor 63 for detecting the atmospheric pressure, a water temperature sensor 64 for detecting the temperature of the cooling water for the engine 1, or the like. Based on the fuel supply amount to be computed on the basis of these various detected signals, a control signal is output to the injector 22. These various detected signals are input to an input port (not illustrated) of an input member or an input portion within the first CPU 51 and are converted to digital signals by an A/D converter (not illustrated).

On the other hand, the second CPU 52 is provided with a constant vehicle speed computing and controlling function (CVSCC) 56. This constant vehicle speed computing and controlling function 56 is connected with a main switch 71 for actuating the constant speed computing and controlling function 56, a transmission sensor 72 for discontinuing the constant vehicle speed travel when shift operation of the transmission occurs, a set switch 73 for setting the vehicle speed for travelling at a constant speed, and a resuming switch 74 for increasing the set speed. From each of these switches ON-OFF signals are input. Further, a traction control unit 8 is connected to the electronic control apparatus 5, and from this traction control unit 8 a signal for cutting off the fuel supply is output to the first CPU 51 and a signal for closing the throttle valve is output to the second CPU 52. The second CPU 52 is arranged to generate a predetermined opening degree signal by the signal for closing the throttle valve.

Figure 3:
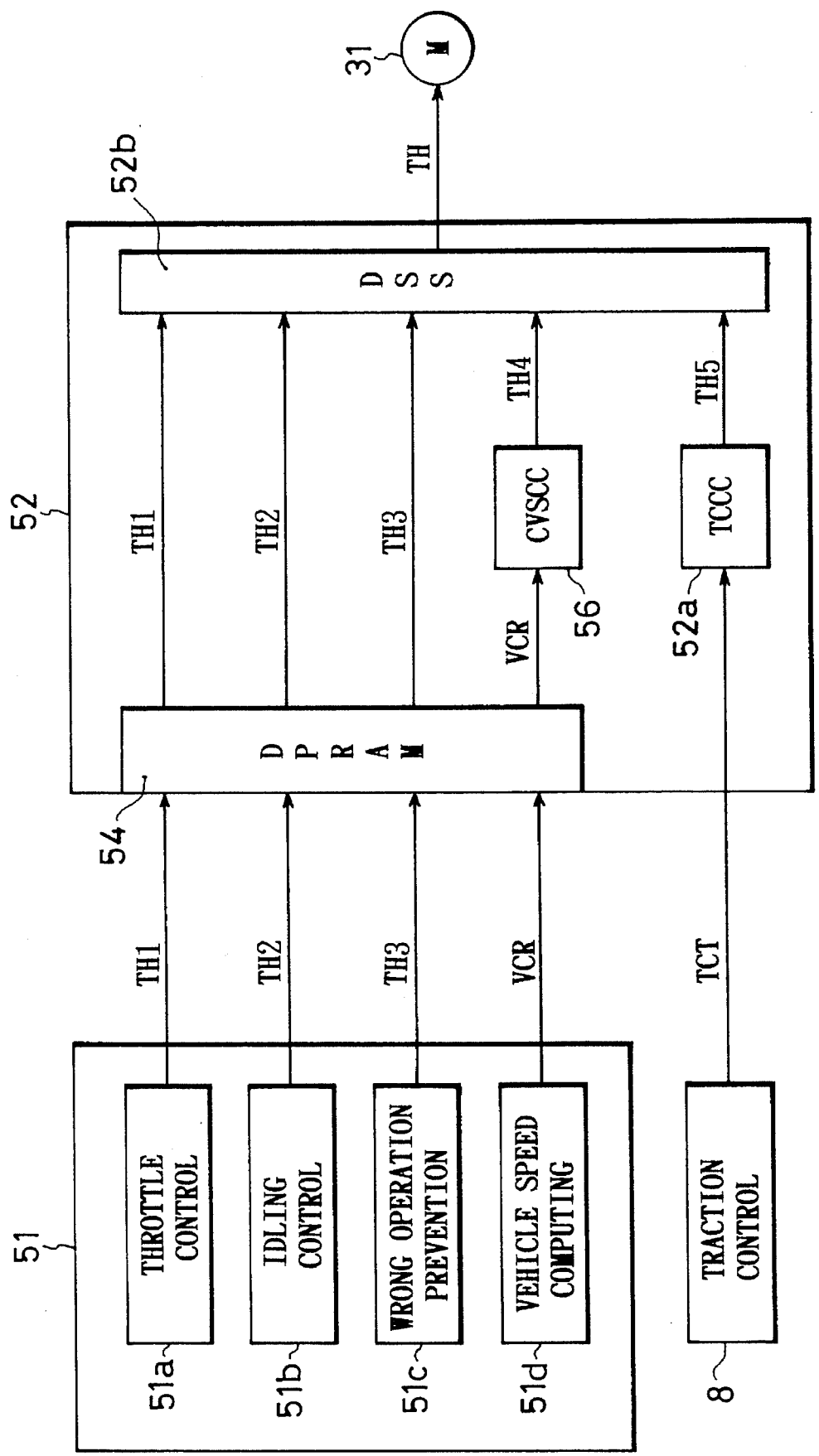
FIG. 3 is a block diagram showing the flow of opening degree signals.

According to the above-described arrangement, the computation of the opening degree signal based on the detected signals in the form of analog signals from the various sensors is carried out in the first CPU 51. As shown in FIG. 3, an opening degree signal TH1 depending on the amount of depression of the accelerator 41 is computed in the throttle control member 51a based at least on the signal of depression amount of the accelerator from the accelerator sensor 4. The throttle control member functions as an opening degree computing member. Further, based on the detected signals of the negative suction pressure sensor 23, rotation sensor 61, vehicle speed sensor 62, atmospheric pressure sensor 63, cooling water temperature sensor 64, or the like, an opening degree signal TH2 for stabilizing the operating conditions of the engine 1 at the time of idling is computed in an idling control member 51b. An opening degree signal TH3 for engine output restriction to prevent the engine 1 from racing or the like is further computed in a wrong operation prevention member 51c. Each of these opening degree signals TH1 through TH3 is output to the DPRAM 54. The first CPU 51 further converts, in a vehicle speed computing member 51d, the vehicle speed signal to be detected by the vehicle speed sensor 62 into a vehicle speed signal VCR for constant speed travel control and is output to the DPRAM 54.

The second CPU 52, on the other hand, generates an opening degree signal TH4 for carrying out a constant speed travelling in the constant speed computing and controlling function 56 based on the vehicle speed signal VCR once the vehicle speed set signal is input by switching on the set switch 73. Further, when it receives a valve closing signal TCT from the traction control unit 8, it generates in a traction control computing and controlling (TCCC) member 52a a valve opening degree signal TH5 for the traction control.

Each of these opening degree signals TH1 through TH5 is transferred to a drive signal selection member 52b. This drive signal selection (DSS) member 52b selects one of the opening degree signals TH1 through TH5 and outputs it to the pulse motor 31 as a driving signal TH. The method of selection in this drive signal selection member 52b is as shown in FIG. 4. Namely, in order to secure first the opening degree required for travelling of the vehicle, the opening degree signal TH1 to be obtained by the amount of depression of the accelerator 41 and the opening degree signal TH4 for the constant speed travelling are compared with each other, and whichever is larger is selected and stored in a memory M1 (step S1). Then, in order to determine the upper limit of the opening degree of the throttle valve 3, a comparison is made between that opening degree signal TH3 for restricting the engine output which was computed to restrict the opening degree and the opening degree signal TH5 for the traction control, and whichever is smaller is selected and stored in a memory M2 (step S2). In case the opening degree signal stored in the memory M1 exceeds that opening degree signal for restricting the opening degree which is stored in the memory M2, the signal must be restricted to the opening degree signal in the memory M2. Therefore, the opening degree signal in the memory M1 and the opening degree signal in the memory M2 are compared with each other, and whichever is smaller is selected and is stored in a memory M3 (step S3). If, however, the opening degree signal stored in the memory M3 is smaller than the opening degree signal TH2 for idling control, the speed of rotation at the time of idling cannot be maintained normal. Therefore, a comparison is made between the opening degree signal stored in the memory M3 and the opening degree signal TH2 to select whichever is larger, and the selected signal is then made to be the driving signal TH (step S4). When this driving signal TH falls outside a predetermined set range, there is a possibility that the pulse motor 31 is damaged or becomes out of tune. Therefore, provided that the range between the fully closed position and the fully open position is defined to be 100%, when the TH falls below 0%, the TH is corrected to 0% and, when the TH exceeds 100%, it is corrected to 100% (steps S5 through S8).

In the CPU 52 for throttle valve control an alternative signal THAP corresponding to the opening degree signal for driving the pulse motor 31 is computed based on the signal of depression amount from the accelerator sensor 4. Since there is provided no high-accuracy A/D converter in the CPU 52 for throttle valve control, it is only possible with the alternative signal THAP to control the pulse motor 31 with less accuracy or precision than the above-described opening degree signal TH1 to be computed by the CPU 51 for fuel control.

Figure 5:
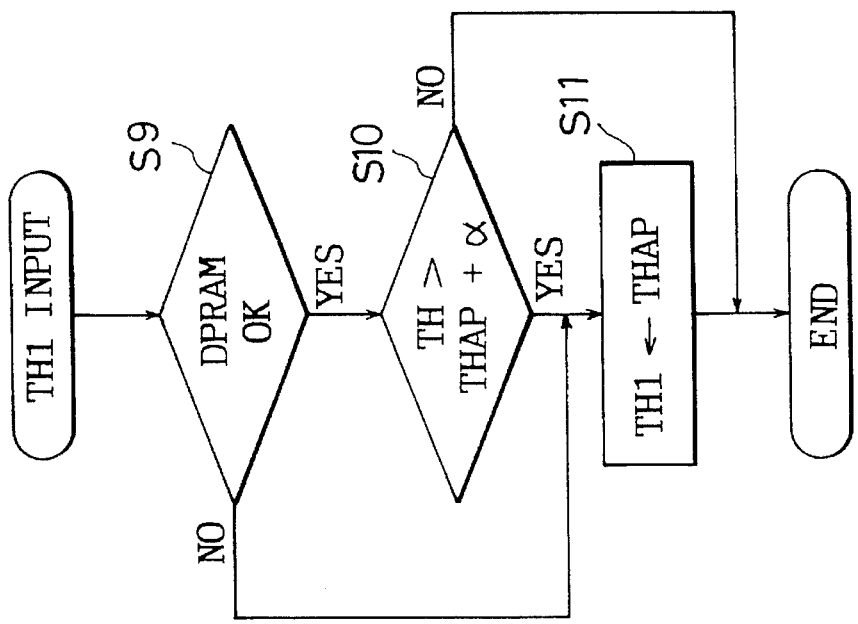
FIG. 5 is a flow diagram showing the processing to be carried out in a CPU for throttle valve control, at the time of occurrence of an abnormality.

Once the above-described opening degree signal TH1 has been transferred to the DPRAM 54 a judgement is made, as shown in FIG. 5, first to judge whether the DPRAM 54 is normal or not (step S9). This method of judgement may be of a conventionally employed one. For example, in the present embodiment, the number of bytes to be transferred is set to be 15 and, among them, 2 bytes are set for summation checking or sum checking and the remaining 13 bytes are set for the data. A comparison is made between the 13-byte sum value written into the bytes for sum checking and the sum value of the data transferred to the DPRAM 54. If both sum values agree with each other, the DPRAM 54 is judged to be normal and, if not, it is judged to be abnormal. Then, in order to judge whether the first CPU 51 is normal or not once the DPRAM 54 has been judged to be normal, a comparison is made between the opening degree signal TH1 from the first CPU 51 and a value which is larger by a predetermined amount $\alpha$ than the above-described alternative signal THAP. If the TH1 exceeds this value, the TH1 is judged to be abnormal (step S10). Then, by using the alternative signal THAP to be computed in the second CPU 52 in place of the TH1 (step S11), the above-described selection process as shown in FIG. 4 is carried out.

Figure 6:
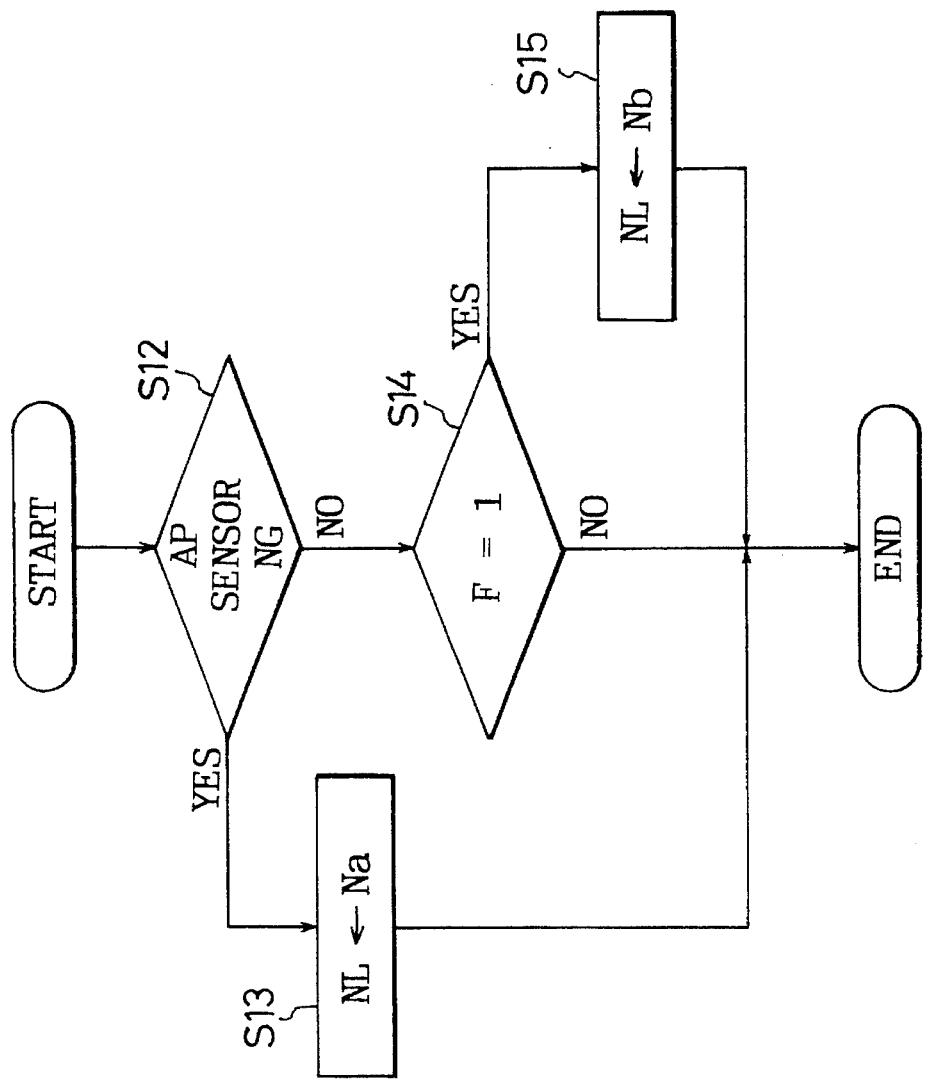
FIG. 6 is a flow diagram showing the processing to be carried out in a CPU for fuel control, at the time of occurrence of an abnormality.

The processing flow shown in FIG. 5 is carried out within the second CPU 52. Inside the first CPU 51 another processing flow as shown in FIG. 6 is also carried out. Inside the first CPU 51 a judgement is first made as to whether the acceleration sensor 4 is abnormal or not (step S12). If the acceleration sensor 4 is abnormal, the operation by the driver of the accelerator 41 cannot be detected. Therefore, a revolution or rotation limit value NL, which is set in advance to restrict the upper limit of the rotational speed of the engine 1, is replaced by a predetermined fixed value Na (e.g., 2000 rpm) so that the speed of rotation of the engine 1 is not raced to a value above Na (step S13). If, on the other hand, the acceleration sensor 4 is normal, there is used to detect abnormalities a flag F which is set to become 1 when at least one of the second CPU 52 and the pulse motor 31 has Given rise to an abnormality, thereby judging whether the flag F is 1 or not (step S14). If the flag F is 1, the above-described NL is replaced by an alternative value Nb which varies by the depression signal AP, thereby carrying out an auxiliary control of the engine 1 (step S15).

Figure 7:
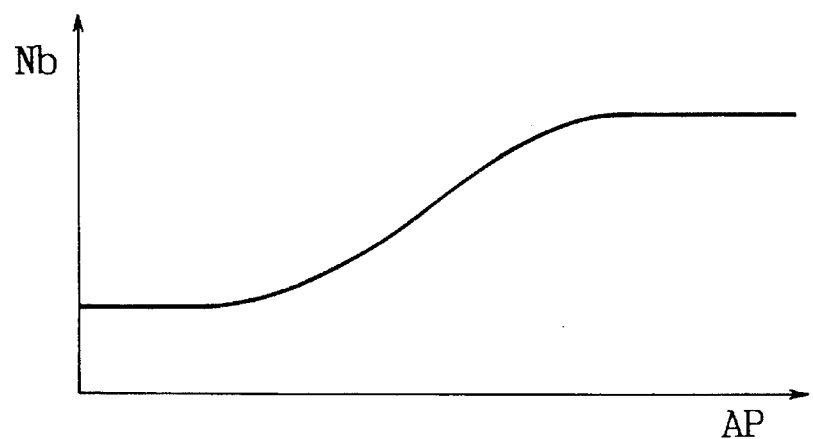
FIG. 7 is a graph showing the relationship between the amount of depression of an accelerator and an upper limit restriction value of revolution or rotation speed of an engine.

This alternative value Nb is so set, as shown in FIG. 7, as to increase similarly with the increasing signal AP which represents the amount of depression. Therefore, when the driver depresses the accelerator 41, the revolution or rotation limit value also increases. It is thus possible to drive the vehicle without impairing the running performance. Further, the speed of rotation of the engine 1 does not race above this value Nb.

It is readily apparent that the above-described electronic control apparatus for an engine meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An electronic control apparatus for controlling an internal combustion engine of a vehicle, said apparatus having a first central processing unit (CPU) for fuel control which controls an amount of fuel to be supplied to the internal combustion engine and a second CPU for throttle valve control which outputs a driving signal to an actuator which operates to open and close a throttle valve disposed in an intake pipe to the internal combustion engine, said apparatus comprising:

an opening degree computing member which is provided in said first CPU to compute an opening degree of the throttle valve based at least on an amount of depression of an accelerator and then to output a result thereof as an opening degree signal;

said first CPU and said second CPU being connected together by a communication line which transfers said opening degree signal from said opening degree computing member from said first CPU to said second CPU, thereby providing the driving signal which opens and closes the throttle valve, thereby controlling the internal combustion engine.

2. An electronic control apparatus according to claim 1, wherein said second CPU further comprises a constant speed computing and controlling member which computes the opening degree of the throttle valve which causes the vehicle to travel at a constant speed, said constant speed being set by a vehicle speed setting signal provided by a setting means, said driving signal being determined based upon an output of said constant speed operating and controlling member and on said opening degree signal from said first CPU.

3. An electronic control apparatus according to claim 1, wherein said second CPU further comprises a judging means which determines if said opening degree signal from said first CPU is abnormal based on the amount of depression of the accelerator.

4. An electronic control apparatus for an internal combustion engine of a vehicle, said apparatus having a central processing unit (CPU) for throttle valve control for outputting an opening degree signal to an actuator which operates to open or close a throttle valve disposed in an intake pipe to the engine, said apparatus comprising:

a central processing unit (CPU) for opening degree computation for computing an opening degree of the throttle valve based at least on an amount of depression of an accelerator, and for outputting a result thereof as a first opening degree signal to said CPU for throttle valve control;

said CPU for throttle valve control comprising:

computing means for computing a second opening degree signal as a backup signal based on the amount of depression of the accelerator;

a memory member coupled to said CPU for memorizing said first opening degree signal from said CPU for opening degree computation; and alternative driving means for outputting said second opening degree signal to the actuator as an actual opening degree signal when said memory member is abnormal.

5. An electronic control apparatus for an engine of a vehicle, said apparatus having a central processing unit (CPU) for throttle valve control for outputting an opening degree signal to an actuator which operates to open or close a throttle valve disposed in an intake pipe to the engine, said apparatus comprising:

a central processing unit (CPU) for opening degree computation for computing an opening degree of the throttle valve based at least on an amount of depression of an accelerator and for outputting a result thereof as a first opening degree signal to said CPU for throttle valve control;

said CPU for throttle valve control comprising:

computing means for computing a second opening degree signal as a backup signal based on the amount of depression of the accelerator;

a memory member coupled to said CPU for memorizing said first opening degree signal from said CPU for opening degree computation; and auxiliary driving means for judging, based on said second opening degree signal, an abnormality of said first opening degree signal which is stored in said memory member, and for outputting said second opening degree signal to the actuator when said first opening degree signal is judged to be abnormal.

6. An electronic control apparatus for a speed of an engine of a vehicle, said apparatus having a central processing unit (CPU) for throttle valve control for outputting an opening degree signal to an actuator which operates to open or close a throttle valve disposed in an intake pipe to the engine and thereby controlling the speed of the engine, said apparatus comprising a central processing unit (CPU) for auxiliary control, said CPU for auxiliary control comprising:

abnormality detecting means for detecting an abnormality of said CPU for throttle valve control; and auxiliary control means for changing, when said abnormality detecting means has detected abnormality, an upper limit of the speed of the engine based on an amount of depression of an accelerator to restrict the speed of the engine under the upper limit.

* * * * *